United States Patent
Miyasaka et al.

(10) Patent No.: US 6,361,737 B1
(45) Date of Patent: *Mar. 26, 2002

(54) METHOD FOR PRODUCING A SINTERED POROUS BEARING AND THE SINTERED POROUS BEARING

(75) Inventors: Motohiro Miyasaka, Nagareyama; Toshikazu Takehana, Edosaki-machi, both of (JP)

(73) Assignee: Hitachi Powdered Metal Co., Ltd., Chiba (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,436

(22) Filed: Jan. 31, 2000

Related U.S. Application Data

(63) Continuation of application No. 08/903,734, filed on Jul. 31, 1997, now Pat. No. 6,049,983.

(30) Foreign Application Priority Data

Aug. 2, 1996 (JP) .............................................. 8-220654

(51) Int. Cl.$^7$ ................................ B22F 3/02; B22F 3/12

(52) U.S. Cl. ................................. 419/2; 419/38; 419/66
(58) Field of Search ................................. 419/28, 2, 66, 419/38

(56) References Cited

U.S. PATENT DOCUMENTS 6,049,983 A * 4/2000 Miyasaka et al. ...... 29/898.057
6,119,346 A * 9/2000 Miyasaka et al. ........ 29/898.02

* cited by examiner

*Primary Examiner*—Daniel J. Jenkins
(74) *Attorney, Agent, or Firm*—Kilpatrick Stockton LLP

(57) ABSTRACT

A cylindrical sintered material is placed in a cavity composed of die, a core disposed in the center of the die, and a pair of upper and lower punches provided within the die and compressed by the upper and lower punches. A gap is provided between an internal circumferential portion of the sintered material and an external circumferential portion of the core. Consequently, when the sintered material is compressed, plastic flow is produced at both ends of the sintered material so that an internal circumferential portions at corresponding portions protrude inward in a radius direction till the internal circumferential portions come into contact with the core, so that slide portions are formed.

4 Claims, 5 Drawing Sheets

METHOD FOR PRODUCING A SINTERED POROUS BEARING AND THE SINTERED POROUS BEARING

CROSS-REFERENCE TO RELATED APPLICATION

This is a continuation of application Ser. No. 08/903,734 filed Jul. 31, 1997 and now U.S. Pat. No. 6,049,983.

BACKGROUND OF THE INVENTION

1. Field of the Invention

This invention relates to a method for producing a sintered porous bearing and the sintered porous bearing for use in, for example, spindle motors rotating at high speeds and a production method therefor, and more particularly to the method for producing a sintered porous bearing and the sintered porous bearing which eliminates loss of energy due to abrasion by high speed rotation, eliminates increase of abrasion due to vibration and the like and enables to be used in a long-term.

2. Description of the Related Art

Conventionally, a sintered porous bearing (hereinafter referred to as bearing) in which a middle portion along an axis of an internal circumferential portion which contacts a shaft has a larger diameter than that of both ends and is expanded toward the inside of the bearing substance has been known. This type of the bearing is subjected to a small rotation resistance against the shaft because the expanded portion in the middle portion is not in contact with the shaft and therefore suitable for supporting the shaft rotating at high speeds. For example Japanese Patent Publication No. 60-54525 has disclosed a art that by using die having a gap for part of an external circumferential portion of a sintered object, the sintered material having straight cylindrical faces of its internal and external circumferential portions is recompressed so as to expand its middle portion along its axis of the sintered material toward outside in the radius direction thereby forming a middle expanded portion in the bearing substance. The similar arts have been disclosed in Japanese Patent Publication No. 6-4883, Japanese Patent Application Laid-Open No. 62-151502. Further, Japanese Patent Application Laid-Open No. 2-8302, Japanese Patent Application Laid-Open No. 3-240901 and Japanese Patent Application Laid-Open No. 1-242821 have disclosed an art that the internal circumferential portion of a bearing is formed in cylindrical form having steps including a large diameter portion and a small diameter portion and then an end portion of the large diameter portion is drawn so as to reduce the diameter thereof thereby forming a middle expanded portion.

According to the above described conventional arts, the external circumferential portions of the bearings in any cases are not straight because of stepped formation, then mounting those bearings onto a housing is difficult. That is, because the external circumferential portion of the large diameter portion of the bearing is not restrained at the time of recompression, not only a disparity occurs in dimensional accuracy but also the bearing is supported unstably so that a large load cannot be supported when it is mounted on the housing because it is supported only by either the large diameter portion or the small diameter portion. Further, with respect to art of reducing the diameter by drawing the end of the large-diameter portion, a difference occurs in internal porosity because a degree of processing differs between both ends of the bearings.

Additionally, Japanese Patent Publication No. 63-43611 and Japanese Patent Publication No. 4-45962 have disclosed such art that first a concave portion is formed such that it extends around an entire circumferential portion of a middle portion in axial direction of an external circumferential portion of a bearing by mechanical processing and then by recompressing the bearing in the axial direction, the concave portion is made to expand toward the outside so as to form an expanded portion on an internal circumferential portion thereof. However, because the sintered porous bearing is superior in some respect to other bearings because it can be produced at a relatively low cost, cutting processing is actually impossible in viewpoints of production cost.

Further, Japanese Patent Application Laid-Open No. 2-107705 has disclosed an art that at the time of sizing, a large diameter portion formed on a core is positioned in a middle portion in the axial direction of a bearing, the bearing is compressed along the axial direction, the bearing is drawn out of a die together with the core and the core is pulled out of the bearing. According to this art, although an external circumferential portion of the bearing can be formed in straight form, because the bearing is subjected to elastic deformation when the core is pulled out, a dimension of the large diameter portion formed on an internal circumferential portion of the bearing can not be set large and further setting of the density of the bearing is also restrained.

According to Japanese Utility Model Application Laid-Open No. 61-124702, a concave portion is formed around an entire surface of a middle portion in the axial direction of an external circumferential portion of a bearing, this bearing is pressed into an inside of a housing case and the diameter thereof is reduced corresponding to a distance of the pressing so as to form a middle expansion in an internal circumferential portion thereof. However, this art has such disadvantages that a high precision is required in the internal dimension of the housing case and material thereof is limited.

According to the above arts, contact area is reduced by forming the middle expanded portion on the internal circumferential portion of the bearing. To attain the same effect, for example Japanese Patent Publication No. 42-15447 has disclosed an art that a plurality of longitudinal grooves extending in the axial direction are formed on an internal circumferential portion thereof. According to Japanese Patent Publication No. 44-15683, a plurality of longitudinal grooves are formed on an internal circumferential portion of the bearing and after that, by correcting the entire internal circumferential portion to a real circular shape as viewed in section, a density of a portion having grooves is adjusted so as to be low and a density of a portion having no grooves is adjusted so as to be high. Further, Japanese Utility Model Publication No. 47-36739 has disclosed a bearing in which the density of a portion containing a longitudinal groove is made low and at the same time the density of a portion between the longitudinal grooves is made high. Further, Japanese Patent Publication No. 47-50899 has disclosed a bearing in which a sectional shape of an internal circumferential portion thereof is constituted of plural circles having a larger curvature than a radius of a shaft. In this bearing, clearance between the bearing and the shaft varies along its circumferential portion and the shaft is supported by hydraulic pressure produced when lubricant is sucked from a portion having a large clearance to a portion having a small clearance.

A number of arts similar to the aforementioned bearings have been proposed and further various groove types such as angled grooves and spiraled grooves have been proposed. A common purpose of these proposals is to reduce a rotational resistance of a shaft or concretely speaking, a resistance (resistance by fluid lubrication) between an internal circumferential portion of a bearing and an external circumferential portion of a shaft which is a particular problem in high speed rotations. However, although such an object is attained by these proposals, they have such disadvantages that hydraulic pressure drops because lubricant leaks outside from both ends of the bearing through its grooves and lubricant is seriously consumed. These result in drop of bearing performance. Although various kinds of bearings for high speed rotation have been proposed since before, any one of them has its own disadvantages.

SUMMARY OF THE INVENTION

The present invention has been achieved with such points in mind.

It therefore is an object of the present invention to provide a method for producing a sintered porous bearing in which production of the bearing is very easy.

It is another object of the present invention to provide a method for producing a sintered porous bearing in which a external circumferential portion of the bearing can be formed in a straight form.

It is still another object of the present invention to provide a sintered porous bearing on which wear resistance can be reduced because density in a slide portion thereof is high.

It is further object of the present invention to provide a sintered porous bearing in which an external circumferential portion thereof is formed in straight form and which has a high performance.

To achieve the objects, according to a first aspect of the present invention, there is provided a method for producing a sintered porous bearing comprising the steps of: placing a cylindrical sintered material in a cavity composed of a die, a core having a smaller diameter than an internal diameter of the sintered material and disposed in the center of the die, and punches provided within the die; compressing the sintered material by the punches in an axial direction so that internal circumferential portions of both ends of the sintered material protrude inward in a radius direction in a gap between the internal circumferential portion of the sintered material and an external circumferential portion of the core; and further compressing the sintered material by the punches in the axial direction till the internal circumferential portions of both ends of the sintered material come into contact with the external circumferential portion of the core to form slide portions sliding on a shaft to be inserted into the sintered porous bearing.

According to a second aspect of the present invention, as it depends from the first aspect, an end face of the sintered material is provided with a protruding edge for protruding in the axial direction for coming into contact with an end face of the punch.

According to a third aspect of the present invention, as it depends from the first or the second aspect, an end face of the punch is provided with a protruding edge for protruding in the axial direction for coming into contact with an end face of the sintered material at the vicinity of the of the internal circumferential portion.

According to a fourth aspect of the present invention, as it depends from one of the aspect among the first aspect to the third aspect, an end face of the sintered material is provided with a protruding edge for protruding in the axial direction for coming into contact with an end face of the punch; and the face of the punch is provided with a protruding edge for protruding in the axial direction for coming into contact with the face of the sintered material at the vicinity of the of the internal circumferential portion.

According to a fifth aspect of the present invention, as it depends from one of the aspect among the first aspect to the fourth aspect, the sintered material is formed with a concave portion extending in the axial direction at the internal circumferential portion thereof, the concave portion extends from an end to the other end of the internal circumferential portion thereof.

According to a sixth aspect of the present invention, as it depends from one of the aspect among the first aspect to the fifth aspect, in the step further compressing the sintered material for forming the slide portion, the internal circumferential portions of both ends of the sintered material protrudes in the radius direction so as to come into contact with the core till the concave portion formed on the internal circumferential portion of the sintered material is flattened to be vanished.

According to the above production method, because there is provided a gap between the internal circumferential portion of the sintered material and the external circumferential portion of the core, plastic flow is produced in the vicinity of both ends of the sintered material which is pressed directly by the punches so that the internal circumferential portion is protruded in a direction of the core which is not restrained. As a result, the internal circumferential portions at both ends of the sintered material are contracted so that a middle expanded portion in which an internal diameter of a middle portion is larger is produced. Because according to the present invention, the sintered material is compressed in the axial direction so that the middle expanded portion is formed as described above, the external circumferential portion of the sintered material can be formed in straight form. However, the present invention does not exclude modifications in which the external circumferential portion is provided with steps, tapered or formed in other configurations.

In such an art in which a middle portion in the axial direction of the sintered material is expanded outward in the radius direction as conventional arts, formation of grooves in an internal circumferential portion of die (Japanese Patent Publication No. 60-54525) or machining of circular grooves in the sintered material (Japanese Patent Publication No. 63-43611) is necessary. The present invention requires no such treatment and therefore production of the bearing is very easy. Further, although conventional arts are not capable of producing products having a short length in the axial direction, the above production method has no restriction in terms of product length. Further, because end portions of the sintered material are not drawn, setting of its entire density is relatively free and a difference in step of the middle expanded portion can be set so as to be relatively large.

Here, compression by punches is desired to be carried out until the internal circumferential portion at both ends of the sintered material is pressed up to the external circumferential portion of the core. Consequently, the configuration of both end portions in contact with a shaft becomes the same as the external circumferential portion of the core (e.g., circular in section) so that a desired configuration and dimension can be formed. Further because the internal circumferential portions at both ends of the sintered material are pressed up to the external circumferential portion of the core, the density of a portion facing the internal circumferential portion of the slide portion is intensified thereby realizing production of an ideal bearing.

According to a seventh aspect of the present invention, there is provided a sintered porous bearing, comprising: a hole portion engaging with a shaft to be inserted into the sintered porous bearing; and slide portions provided on an internal circumferential portion of the hole portion at both ends thereof in an axial direction, the slide portions coming into contact with the shaft, wherein an internal diameter of the slide portion is smaller than a diameter of an internal circumferential portion in a middle portion of the hole portion; and a density of the internal circumferential portion of the slide portion is higher than the density of an external circumferential portion of the slide portion.

Here, in the hole portion, the middle portion in the axial direction can be expanded with a larger diameter than both ends, however it is permissible to so construct that part of the middle portion in the axial direction is in contact with the shaft. Concretely speaking, it is possible to provide the middle portion in the axial direction of the cylindrical hole portion (e.g., cylinder) with one or two or more concave portions extending along the axial direction. This concave portion may be communicated with end faces of the sintered material or may be formed so that it does not reach the end faces. In this case, a bottom of the concave portion is a portion most outside of the internal circumferential portion or a portion forming the most outside diameter of the hole portion.

In this bearing, its wear resistance is excellent because the density in the slide portion is high. By providing the other portions with a low density (that is, increasing the porosity), it is possible to contain a sufficient amount of lubricant. Accordingly, the service life of the bearing can be extended long without providing with any special oil supplying mechanism for supplying lubricant to the external circumferential portion of the bearing.

To obtain a shape of the bearing in which the middle portion is expanded, providing at least one of end faces on the internal circumferential side of the sintered material and end faces to be in contact with the sintered material, of the punches, with a protruding edge which is protruded in the axial direction is effective. According to this production method, plastic flow at both ends of the sintered material is large so that the difference of step of the middle expanded portion can be further increased. Meantime, it is permissible to provide the protruding edge around an entire circle of the end face continuously or intermittently. Further, it is permissible to provide it in any position of the middle position, on the internal circumferential side and the external circumferential side in the radius direction.

According to a eighth aspect of the present invention, there is provided a sintered porous bearing, comprising: a hole portion engaging with a shaft to be inserted into the sintered porous bearing; and slide portions provided on an internal circumferential portion of the hole portion at both ends thereof in an axial direction, the slide portions coming into contact with the shaft, wherein a diameter of an internal circumferential portion in a middle portion of the hole portion is larger than an internal diameter of the slide portion; and the hole portion is provided with a concave portion extending in the axial direction at the internal circumferential portion thereof.

Lubricant is stored in a gap between the middle portion in the axial direction of this bearing and a shaft such that lubricant is supplied to the slide portions. Although this point is the same as conventional examples described above, this bearing is characterized in having the concave portions in the middle expanded portion.

Because the bearing according to the second aspect of the present invention is provided with concave portions in the middle expanded portion, even if the difference of the step of the middle expanded portion is small, lubricant can be stored in the concave portions so that storage amount of lubricant is sufficient. Further, because a distance to the shaft is increased in the concave portion, flow resistance of lubricant can be reduced. Further, an effect of dynamic pressure is produced because lubricant in the concave portions is sucked to a portion having a small clearance, so that deflection of the shaft can be further effectively reduced. Thus in the bearing according to the second aspect, there is no any inconvenience although the difference of the step in the middle expanded portion is small.

Generally, the slide portions are subjected to machining such as reaming before actual use. Needless to say, it is easy to determine concentricity for two slide portions because the area to be machined is small.

As the concave portions, one or two or more grooves extending along the axis are preferable and they may be either parallel to the axis or spiraled. Further, the concave portions may be contained within the middle expanded portion, reach the slide portions or communicate with end faces of the bearing.

In case the concave portions are disposed so that they are contained within the middle expanded portion, an area of the slide portion is secured so that a capacity of supporting oil film (bearing rigidity) is intensified. Because leakage of lubricant to outside is not produced, wear of the shaft and bearing is small and thus any outside oil supplying mechanism is not required. Further because lubricant pressurized in the concave portions is forced to exude into the slide portions, supply of lubricant is carried out sufficiently. This operation and effect can be obtained even in such a structure in which the concave portions extend up to the inside of the slide portions.

Meanwhile, the concave portions described above may be applied to the first bearing of the present invention and therefrom the same operation and effect can be obtained.

According to a ninth aspect of the present invention, there is provided a sintered porous bearing, comprising: a hole portion engaging with a shaft to be inserted into the sintered porous bearing; and a concave portion formed, in a middle portion in an axial direction of the hole portion, the concave portion extending from an end of the hole portion to the other end thereof, the concave portion not reaching the each end of the hole portion.

In this bearing as well, lubricant is stored in the concave portions like in the second bearing and lubricant pressurized within the concave portions is forced to be exuded to the slide portions. Thus the slide portions are supplied with a sufficient amount of lubricant. Further, because leakage of lubricant to outside is not produced, consumption of lubricant is small and any outside oil supplying mechanism is not required. Further, because deflection of the shaft can be effectively reduced due to an effect of dynamic pressure and some area is secured in the slide portions, the capacity of supporting oil film is intensified. As the concave portions, one or two or more grooves extending along the axis are preferable and they may be either parallel to the axis or spiraled.

Although a production method for the bearing having the aforementioned concave portions may be selected arbitrarily, some device is needed to form the concave portions such that they do not reach the end faces of the sintered material. Thus in the present invention, such processing is carried out in following manner.

That is, according to the production method for the bearings of the present invention, concave portions extending from an end to the other end are formed on the internal circumferential portion of the sintered material and then the aforementioned production steps of the present invention are carried out so as to make the internal circumferential portions at both ends of the sintered material protrude inward in the radius direction and vanish the concave portions on the slide portions.

According to this production method, there is no problem if the concave portions formed on the internal circumferential portion of the sintered material communicate with both end faces, therefore production thereof is very simple. As for a forming method for the concave portions, it is desirable to provide protrusions (protruding edges) on a core for use in formation of green compact or sizing, however they may be formed by machining the sintered material. Further it is possible to process such that the concave portions on the internal circumferential portion at both ends of the sintered material are not vanished.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1A:
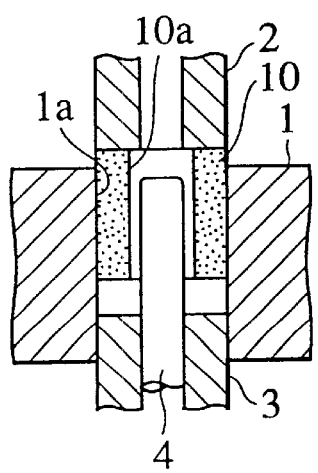
FIG. 1A, FIG. 1B and FIG. 1C are sectional views of die for explaining production method of a first embodiment of the present invention.

There will be detailed below the preferred embodiments of the present invention with reference to the accompanying drawings. Like members are designated by like reference characters.

Hereinafter, a first embodiment of the present invention will be described with reference to FIGS. 1A, 1B and 1C.

Figure 1B:
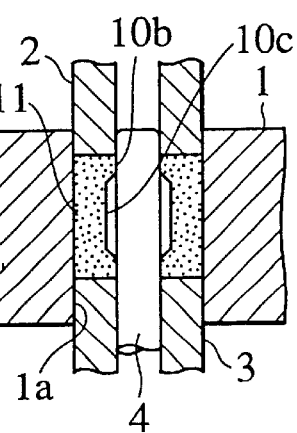
Figure 1C:
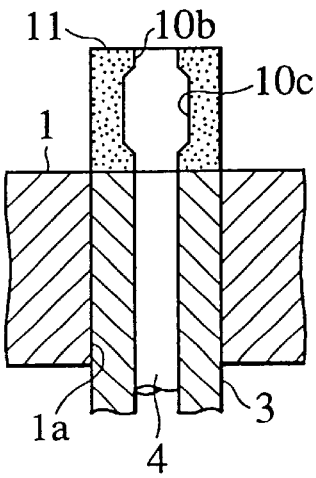

FIGS. 1A, 1B and 1C are longitudinal sectional view of a die showing respective steps in production method of the first embodiment. Reference numeral 1 in the Figures denotes a die having a hole 1a the section of which is circular and reference numerals 2, 3 denote an upper punch and a lower punch which engage the hole 1a in the die 1 such that they are vertically movable. Numeral 4 denotes a cylindrical core. An upper end of the core 4 can engage in a hollow portion in the upper punch 2. Numeral 10 denotes a sintered material. The sintered material 10 is cylindrical and an internal diameter of the hole (hole portion) 10a is set so as to be larger than that of the core 4.

For producing a bearing using this die, first, a sintered material 10 is inserted into a cavity formed by the die 1, the lower punch 3 and the core 4 as shown in FIG. 1A. And as shown in FIG. 1B, the upper punch 2 is descended so as to compress the sintered material. Then, both ends of the sintered material 10 undergoes plastic flow so that an internal face thereof is protruded toward the core 4. In this stage, by further compressing the sintered material, the protruded portion of the internal circumferential portion of the sintered material comes into contact with an external circumferential portion of the core 4. The protruded portion is pressed by the external circumferential portion of the core 4 so that a slide portion 10b having the same diameter as the core 4 is formed and the middle expanded portion 10c having a larger diameter than the slide portion 10b is formed. Next, the upper and lower punches 2, 3 and the core 4 are raised and then the bearing 11 is removed from the die.

Because, in the bearing 11 produced in the above manner, the slide portion 10b is pressed by the core 4 such that it is compressed, the density of the slide portion 10b is larger than the densities of a portion exterior thereto and a portion extended from the interior to the exterior. Thus, while the slide portion 10b has a high wear resistance, the other portion has a small density so that it is capable of containing ample lubricant.

Because according to the above production method, an ideal bearing having a straight external circumferential portion can be produced without any special treatment upon the die 1 and the core 4, the production cost is not increased and further a length of the bearing 11 does not have any restriction. Further, setting of an entire density is relatively free and further a difference in step of the middle expanded portion 10c can be set relatively large.

Figure 2A:
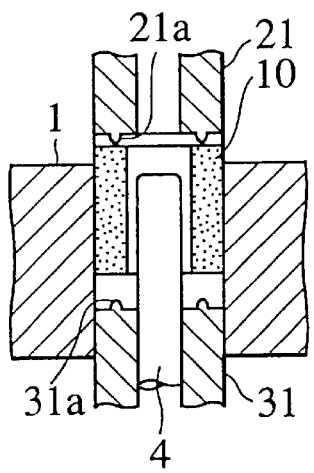
FIG. 2A, FIG. 2B, FIG. 2C and FIG. 2D are sectional views of die for explaining a modification of the first embodiment.
Figure 2B:
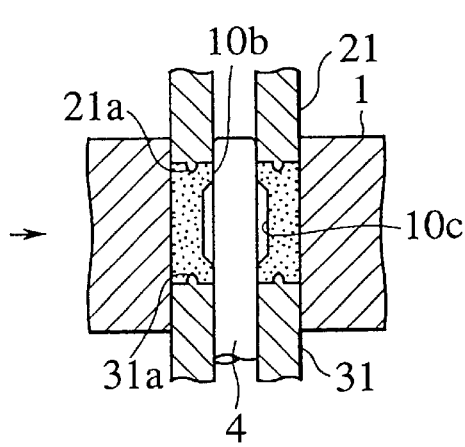
Figure 2C:
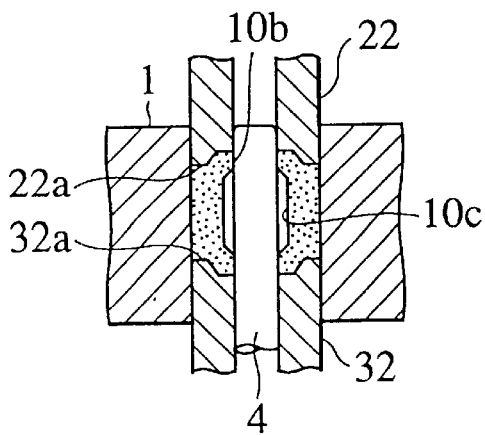
Figure 2D:
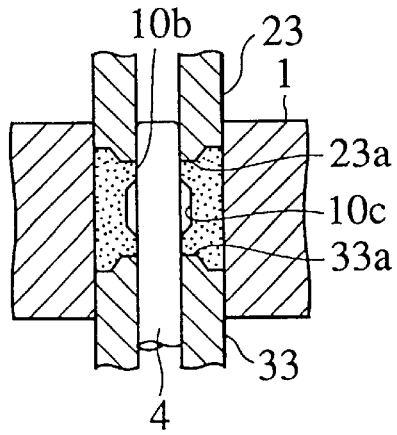
Figure 3A:
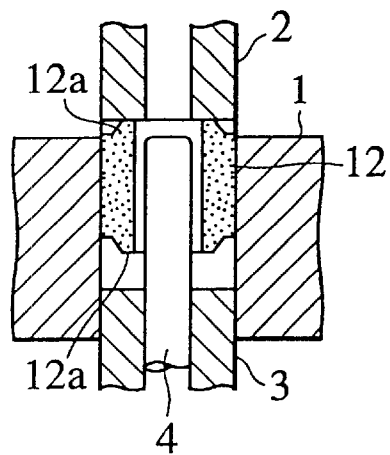
FIG. 3A and FIG. 3B are sectional views of die for explaining a modification of the first embodiment.
Figure 3B:
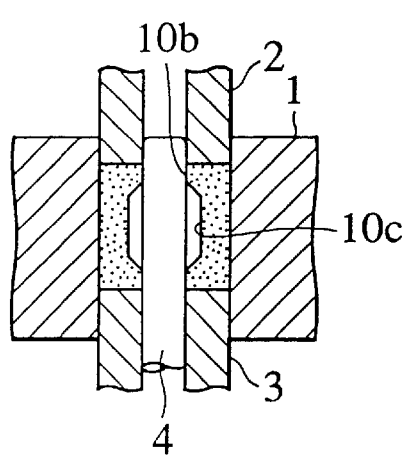

Next, FIGS. 2A, 3B show an example of modification of the above first embodiment. A feature of the modification shown in FIGS. 2A, 2B is that protruding edges 21a, 31a extending on each entire circle are formed in a middle portion in the radius direction of end faces of the upper and lower punches 21, 31. Using such upper and lower punches 21, 31 produces a high plastic flow in both ends of the sintered material 10 and enables the difference of step in the middle expanded portion 10c to be further increased. FIG. 2C shows an example in which protruding edges 22a, 32a are formed on external circumferential side of end faces of the upper and lower punches 22, 32. FIG. 2D shows an example in which protruding edges 23a, 33a are formed on internal circumferential side of end faces of the upper and lower punches 23, 33. FIG. 3 shows an example in which protruding edges 12a are formed on internal circumferential side of both end faces of the sintered material 12, in which substantially the same operation and effect as above are produced.

Figure 4A:
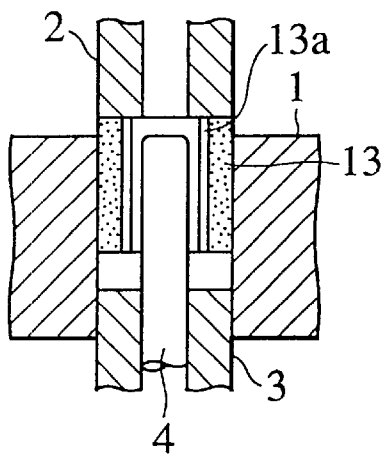
FIG. 4A and FIG. 4B are sectional views of die for explaining a production method of a second embodiment.
Figure 4B:
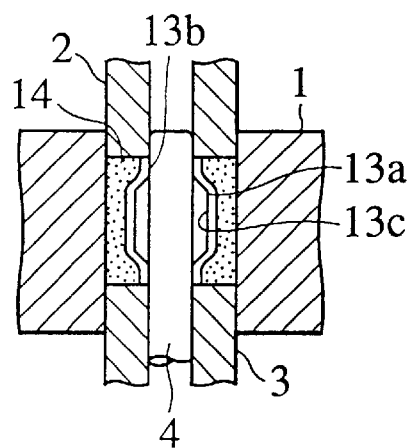
Figure 4C:
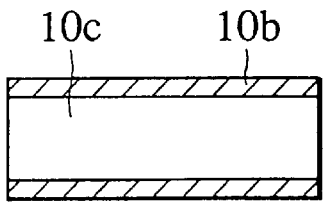
FIGS. 4C and FIG. 4D are expanded drawings for an internal circumferential portion of a bearing.
Figure 4D:
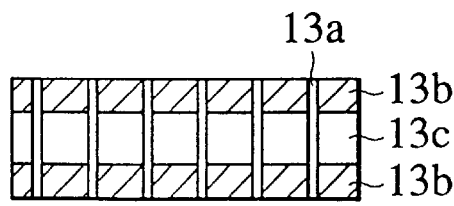

A second embodiment of the present invention will be described with reference to FIGS. 4A–4D. The same reference numerals are attached to the same components as those of the first embodiment and a description thereof is omitted. In this Figure, reference numeral 13 denotes a sintered material, which is a cylinder having an internal diameter larger than the diameter of the core 4. On the internal circumferential portion are formed a plurality (e.g., 6) of grooves 13a (concave portion) extending in parallel to the axis and at the same interval along the circumferential portion. FIG. 4B shows a state in which the bearing 14 is produced using such a sintered material 13 with the same die as the first embodiment. Due to plastic flow produced on both ends of the sintered material 13, the slide portion 13b which contacts the core 4 and the middle expanded portion 13c having a larger diameter than the slide portion 13b are formed in the bearing 14 and there are left the grooves 13a on the slide portion 13b and the middle expanded portion 13c. FIG. 4D is an expanded view showing a state in which the grooves 13a run between both ends of the bearing 14. For comparison with this, an expanded view of the internal circumferential portion of the bearing 11 according to the first embodiment is shown in FIG. 4C.

Because the grooves 13a store lubricant in the bearing having the above construction, even if the difference of the step of the middle expanded portion 13c is small, an ample amount of lubricant is stored therein. Further, because the grooves 13a enlarge a distance relative to the shaft, flow resistance of lubricant can be reduced. Still further, because an effect of dynamic pressure is produced by lubricant in the grooves 13a, deflection of the shaft can be further effectively reduced. As described above, in the bearing 14, even if the difference of the step of the middle expanded portion 13c is small, there is produced no inconvenience.

Figure 5A:
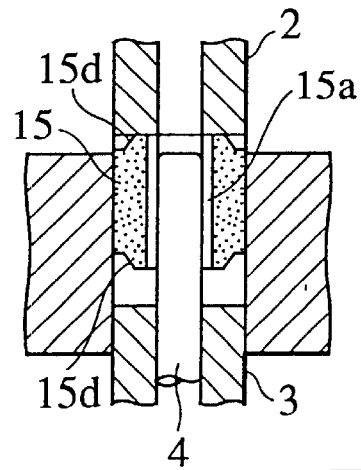
FIG. 5A and FIG. 5B are sectional views of die for explaining a production method of a third embodiment.
Figure 5B:
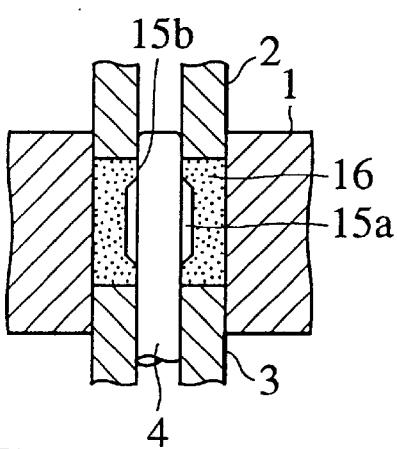
Figure 5C:
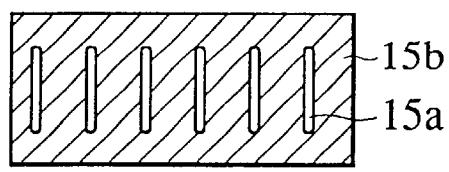
FIG. 5C is an expanded drawing for an internal circumferential portion of the bearing.

Next, a third embodiment of the present invention will be described with reference to FIGS. 5A–5C. In the Figures, reference numeral 15 denotes a sintered material. The sintered material 15 is a cylinder having the same internal diameter as the core 4. A plurality (e.g., 6) of grooves (concave portions) 15a are formed on an internal circumferential portion of the sintered material 15 at the same interval along the circumferential portion thereof. Protruding edges 15d extending along each entire circle are formed on internal circumferential side of both end faces of the sintered material 15. FIG. 5B shows a state in which a bearing 16 is produced using the sintered material 15 by means of the same die as the first embodiment. FIG. 5C is an expanded view of the internal circumferential portion of the bearing 16. As shown in this Figure, the grooves 15a formed in the sintered material 15 are vanished by plastic flow in the slide portion 15b so that the grooves 15a are left only in the middle portion in the axial direction.

Although this bearing 16 has no middle expanded portion like described above, lubricant is stored in the grooves 15a. Consequently, due to an effect of dynamic pressure of lubricant in the grooves 15a, deflection of the shaft can be further effectively reduced. Further, because the grooves 15a are not communicated with outside, leakage of lubricant is not generated so that wear of the shaft and bearing is reduced. Because lubricant within the grooves 15a is pressurized so that it is forced to exude into the slide portion 15b, a sufficient amount of lubricant can be supplied to the slide portion 15b. Further, because some area is secured in the slide portion 15b, a capacity of supporting oil film is high so that rigidity of the bearing Is ensured.

Figure 6A:
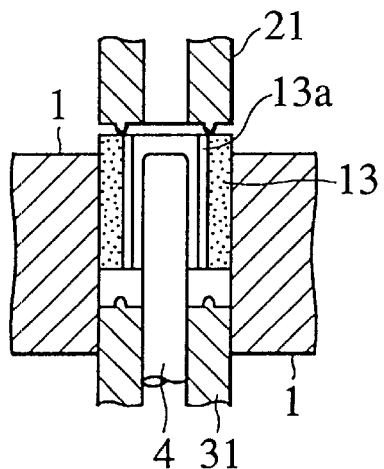
FIG. 6A and FIG. 6B are sectional views of die for explaining a production method of a fourth embodiment.
Figure 6B:
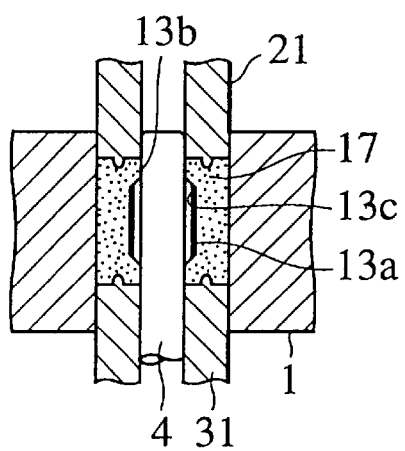
Figure 6C:
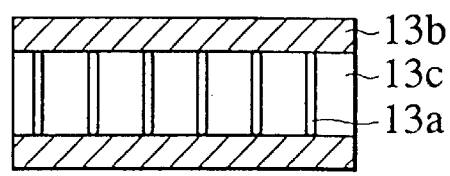
FIG. 6C is an expanded drawing for the internal circumferential portion of the bearing.

A fourth embodiment of the present invention will be described with reference to FIG. 6. According to this embodiment, using the die shown in FIGS. 2A, 2B and the sintered material 13 shown in FIG. 4A, plastic flow at both ends of the sintered material 13 is increased so as to vanish the grooves 13a in the slide portion 13b. In a bearing 17 produced as a result, as shown in FIG. 6 showing an expanded drawing of the internal circumferential portion thereof, the grooves 13a extend within a range of a middle expanded portion 13c.

In such a bearing 17, in addition to the operation and effect of the bearing according to the second embodiment, leakage of lubricant is not produced because the grooves 13a are not communicated with outside, so that wear of the shaft and bearing is reduced. Further because lubricant in the grooves 13a is pressurized, it is forced to exude into the slide portion 13b so that a sufficient amount of lubricant can be supplied to the slide portion 15b. Further because some area is secured in the slide portion 13b, a capacity of supporting oil film is high and rigidity of the bearing is ensured.

Figure 7A:
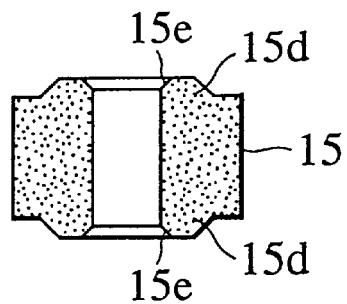
FIG. 7A is a sectional view of a sintered material for explaining a production method of a fifth embodiment.
Figure 7B:
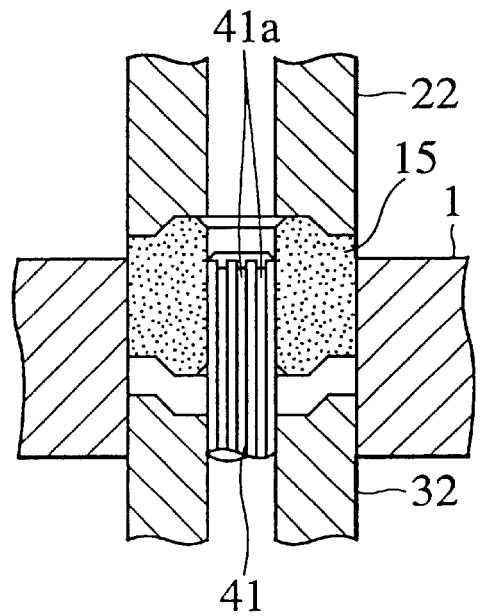
FIG. 7B and FIG. 7C are sectional views of die.
Figure 7C:
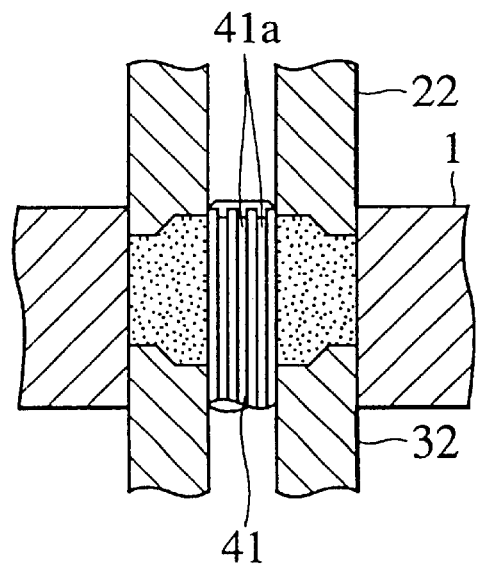

Next, a fifth embodiment of the present invention will be described with reference to FIGS. 7A–9B. Although a sintered material 15 shown in FIG. 7A is the same as that shown in FIG. 5A, speaking more in detail, chamfer on its internal circumferential portion is treated so as to be smaller than a height of protruding edge 15d.

Upper and lower punches 22, 32 are the same as shown in FIG. 2C so that entire end faces thereof are equally in firm contact with end faces of the sintered material 15. Further, the core 41 has the same internal diameter as the sintered material 15 and on a surface thereof are formed a plurality (e.g., 6) of parallel protruding edges 41a, . . . to the axial line.

Figure 8:
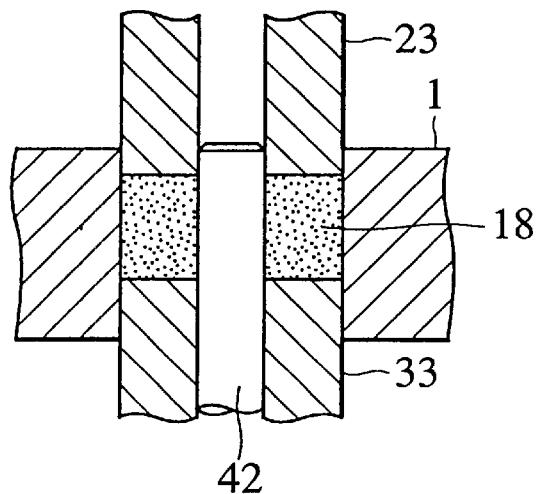
FIG. 8 is a sectional view of die for explaining a production method of the fifth embodiment.
Figure 9A:
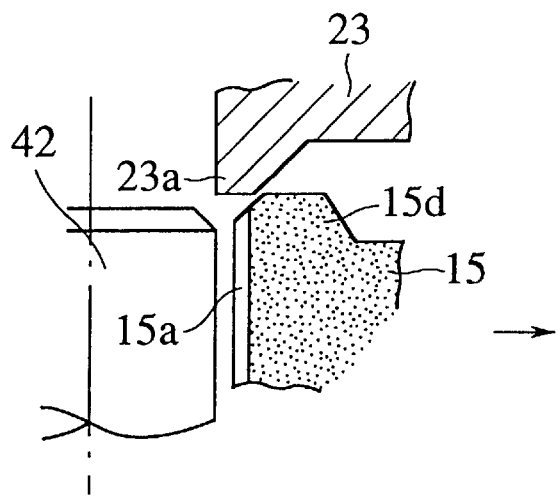
FIG. 9A and FIG. 9B are sectional views of major parts of die for explaining a production method of the fifth embodiment.
Figure 9B:
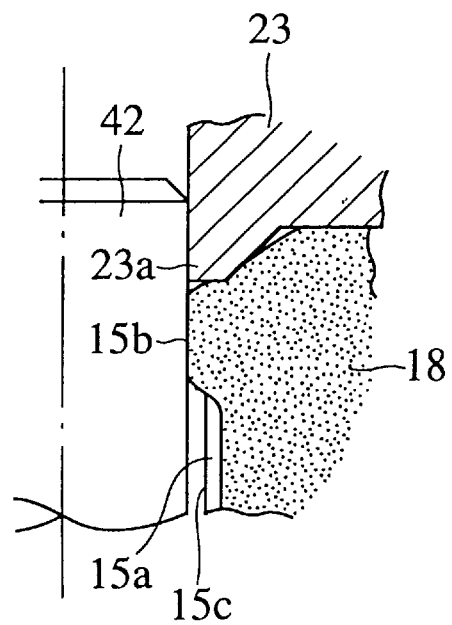

The die shown here are utilized for cutting grooves in an internal circumferential portion of a sintered material 15. FIGS. 8, 9A, 9B show die for use in final forming. Referring to FIG. 8, reference numeral 23 denotes a upper punch, numeral 33 denotes a lower punch and numeral 42 denotes a core. On an internal circumferential side of a lower end face of the upper punch 23 is formed a protruding edge 23a which is protruded downward, along an entire circle of the circumferential portion. Likewise on an internal circumferential side of the lower punch 33 is formed protruding edge (representation is omitted) which is protruded upward, along an entire circle of the circumferential portion. A diameter of the core 42 is smaller than a most inside diameter of the sintered material in which grooves are made.

Next, a method for producing the bearing using the above die will be described. First, the sintered material 15 is placed in die shown in FIG. 7B and compressed by the lower and upper punches 22, 32. Consequently, plastic flow occurs in the entire sintered material 15 so that its internal circumferential portion is contracted thereby being in firm contact with an external circumferential portion of the core 41. As a result, portions corresponding to the protruded portions 41a of the core 41, of the internal circumferential portion of the sintered material 15 are made to the grooves 15a (shown in only FIGS. 9A, 9B). Next, the sintered material 15 is taken out of the die and placed within die shown in FIGS. 9A, 9B and then compressed by the upper and lower punches 23, 33. Then, the protruding edge 15d of the sintered material 15 is pressurized by the protruded portion 23a of the upper and lower punches 23, 33, so that plastic flow is produced thereby being in firm contact with the internal circumferential portion of the core 42. Consequently, the slide portion 15b in which the grooves 15a have been vanished and whose section is real circle is formed and at the same time, the middle expanded portion 15c having a larger diameter than the slide portion 15b is formed. Although the bearing 18 produced in the above manner is substantially the same as that shown in FIG. 6B, its product value is high because no groove is formed on both end faces. According to this production method, production thereof is very simple because there is no problem even if the grooves 15a formed on the internal circumferential portion of the sintered material 15 communicate with both ends. Meanwhile the reason why the chamfer 15e in the sintered material 15 is smaller than the height of the protruding edge 15d is to produce plastic flow securely to vanish the grooves 15a.

The present invention is not restricted to the above embodiments but may be modified in various ways. For example, the present invention may be applied to not only the above rotary bearings but also bearings for direct acting shafts for use in guide posts of die. Thus, the sectional shape of a hole in the bearing is not limited to circle but may be of any shape. Even when the diehown in FIG. 1 are used, production steps shown for the fifth embodiment can be applied.

While preferred embodiments of the present invention have been described using specific terms, such description is for illustrative purposes, and it is to be understood that changes and variations may be made without departing from the spirit or scope of the following claims.

What is claimed is:

1. A method for producing a sintered porous bearing, comprising the steps of:

placing a cylindrical sintered material in a cavity composed of a hole of a die, a core having a smaller diameter than an internal diameter of the sintered material and disposed in the center of the die, and punches provided within the die, in such a manner that a gap is provided between the internal circumferential portion of the sintered material and an external circumferential portion of the core, and that an external circumferential portion of the sintered material circumferentially contacts with an internal circumferential portion of the hole of the die;

approaching the punches to each other in an axial direction of the sintered material until each end face of the punches contacts each end face of the sintered material in a direction perpendicular to the axial direction of the sintered material; and compressing the sintered material by the punches in the axial direction so that both end portions of the internal circumferential portion of the sintered material near to the end faces of the sintered material protrude inward in a radius direction in the gap, until both end portions of the internal circumferential portion of the sintered material near to the end faces of the sintered material come into contact with the external circumferential portion of the core to form side portions sliding on a shaft to be inserted into the sintered porous bearing;

wherein the external circumferential portion of the sintered material circumferentially is kept with the original external circumferential configuration without any deformation of the external circumferential configuration during the compressing step.

2. The method for producing a sintered porous bearing according to claim 1, wherein the end faces of the sintered material are provided with protruding edges protruding in the axial direction of the sintered material, at internal circumferential sides of the both of the end faces of the sintered material; and the compressing step is continued until the protruding edges are vanished so that both of the end faces of the sintered material are flattened.

3. The method for producing a sintered porous bearing according to claim 1, wherein the core is formed with a plurality of protruding portions on the external circumferential portion of the core which are extending in the axial direction of the core; and where both end portions of the internal circumferential portion of the sintered material near to the end faces of the sintered material are formed with the same configuration of the plurality of protruding portions of the core, when both end portions of the internal circumferential portion of the sintered material protrude inward in the radius direction in the gap.

4. The method for producing a sintered porous bearing according to claim 2, wherein the core is formed with a plurality of protruding portions on the external circumferential portion of the core which are extending in the axial direction of the core; and wherein both end portions of the internal circumferential portion of the sintered material near to the end faces of the sintered material are formed with the same configuration of the plurality of protruding portions of the core, when both ends portions of the internal circumferential portion of the sintered material protrude inward in the radius direction in the gap.

* * * * *